Patented Feb. 3, 1942

2,272,153

UNITED STATES PATENT OFFICE 2,272,153

CYCLIC ACETAL

Clarence L. Moyle, Midland, Mich., assignor to The Dow Chemical Company, Midland, Mich., a corporation of Michigan No Drawing. Application May 13, 1941, Serial No. 393,226

4 Claims. (Cl. 260—338)

The present invention relates to cyclic acetals and is particularly directed to a new group of chemical compounds having a following formula:

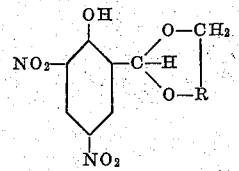

wherein R represents a member of the class consisting of methylene, ethylene, alkyl-methylene, hydroxyalkyl-methylene, and hydroxy-ethylene, and the cyclic-acetal ring contains not more than 6 members.

I have prepared representative members of this group of compounds and found them to be yellow or orange crystalline materials difficultly soluble in water. These compounds are relatively stable on exposure to heat, light and alkali but are rather unstable in the presence of aqueous acid. They may be employed as intermediates in the preparation of more complex organic derivatives or as constituents of parasiticidal compositions.

The compounds may be prepared by reacting 3.5-dinitro-salicylaldehyde with a poly-alcohol of the type of ethylene glycol, trimethylene glycol, or glycerol in the presence of a suitable catalyst such as a mixture of boron trifluoride and concentrated hydrochloric acid. In carrying out the reaction the 3.5-dinitro-salicylaldehyde is dissolved or dispersed in a molecular excess of the poly-alcohol and catalytic amounts of boron trifluoride and hydrochloric acid added thereto. The boron trifluoride is preferably employed in about 45 per cent by weight ethereal solution. With the addition of the catalyst to the reaction mixture, appreciable heat of reaction is evolved. The reaction mixture is then heated and stirred on a steam bath at a temperature between about 75° and 90° C. A heating period of from 15 minutes to 2 hours is generally sufficient for the completion of the reaction. The mixture is then cooled to room temperature and the desired product separated therefrom. Where the crude product is in the form of an oil, the reaction mixture may be diluted with water and/or cooled, and the product recovered by decantation. The oil is then warmed to drive off traces of unreacted alcohol and cooled in order to cause crystallization. Where the crude product of the reaction is in the form of a solid precipitate, the mixture can be filtered and the residue either washed with or recrystallized from a suitable solvent and thereafter dried.

The following examples illustrate the invention but are not to be construed as limiting the same.

EXAMPLE 1.—2-(3'.5'-dinitro - 2' - hydroxy-phenyl)-1.3-dioxolane 4.0 grams (0.019 mol) 3.5-dinitro-salicylaldehyde was suspended in 20.7 grams (0.334 mol) of ethylene glycol. 0.5 gram (0.0033 mol) of boron trifluoride as a 45 per cent by weight solution in ethyl ether, and 12 milliliters of concentrated hydrochloric acid was then added to the mixture whereupon appreciable heat of reaction was evolved. The mixture was heated and stirred on a steam bath for 15 minutes at a temperature of 80–85° C. and thereafter cooled to room temperature. The solid reaction product was recovered by filtration and recrystallized from 25 milliliters of boiling benzene to obtain 4.1 grams of 2-(3'.5-dinitro-2'-hydroxy-phenyl)-1.3-dioxolane as a white crystalline compound melting at 134°–135° C. and containing 10.99 per cent nitrogen as compared to a theoretical nitrogen content of 10.94 per cent. This compound has the formula:

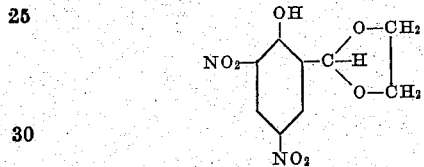

EXAMPLE 2.—2-(3'.5'-dinitro - 2' - hydroxy-phenyl)-1.3-dioxane 0.5 gram (0.0033 mol) of the boron trifluoride in ether solution as described in Example 1, 24.2 grams (0.32 mol) of trimethylene glycol (boiling at 211°–212° C.), 12 milliliters of concentrated hydrochloric acid, and 4.0 grams (0.019 mol) of 3.5-dinitro-salicylaldehyde were mixed together and heated on a steam bath for a period of approximately 15 minutes. The crude reaction mixture was thereafter cooled to room temperature, filtered, and the residue from the filtration recrystallized from 25 milliliters of hot benzene to obtain 2.0 grams of 2-(3'.5'-dinitro-2'-hydroxy-phenyl)-1.3-dioxane as a white crystalline compound melting at 113°–118° C. and containing 10.79 per cent nitrogen as compared to a theoretical nitrogen content of 10.4 per cent. This compound has the formula:

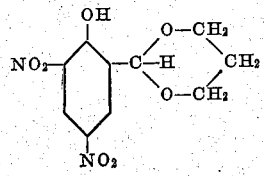

EXAMPLE 3.—*Mixture of 2-(3'.5'-dinitro-2'-hydroxyphenyl)-4-hydroxymethyl-1.3 - dioxolane and 2 - (3'.5' - dinitro-2'-hydroxy - phenyl) -5-hydroxy-1.3-dioxane*

37.8 grams (0.41 mol) of glycerol, 4.0 grams (0.019 mol) of 3.5-dinitro-salicylaldehyde, 0.5 gram (0.0033 mol) of boron trifluoride in ether solution, and 12 milliliters of concentrated hydrochloric acid were mixed together and the mixture heated on the steam bath with stirring at 80° C. for 2 hours. The mixture was then cooled to room temperature, and the oily reaction product separated by decantation and allowed to stand for 3 weeks. At the end of this time the oil had partially crystallized into an amorphous solid. This product was recrystallized from 95 per cent ethyl alcohol whereby a 2 gram portion was obtained as a white crystalline product melting at 135°–136° C. This compound was believed to be 2-(3'.5'-dinitro-2'-hydroxyphenyl)-4-hydroxymethyl-1.3-dioxolane having the formula:

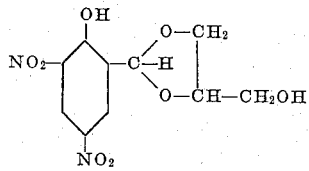

The other constituent of the crude reaction mixture was believed to be 2-(3'.5'-dinitro-2'-hydroxy-phenyl)-5-hydroxy-1.3-dioxane having the formula:

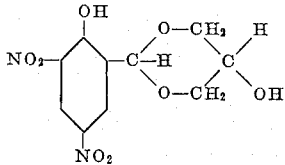

In a similar manner 3.5-dinitro-salicylaldehyde may be reacted with such poly-alcohols as butylene glycol, amylene glycol, and octylene glycol to obtain compounds falling within the scope of the present invention.

I claim:

1. A 2-(3'.5'-dinitro-2'-hydroxy-phenyl) cyclic acetal having the formula:

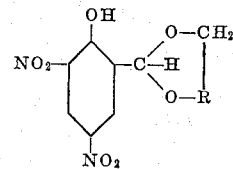

wherein R represents a member of the class consisting of methylene, ethylene, alkyl-methylene, hydroxyalkyl-methylene, and hydroxy-ethylene, and the cyclic acetal ring contains not more than 6 carbon atoms.

2. A 2-(3'.5'-dinitro-2'-hydroxy-phenyl) cyclic acetal having the formula:

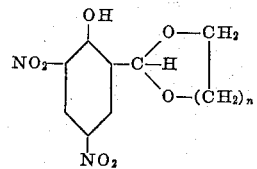

wherein $n$ is an integer not greater than 2.

3. 2-(3'.5'-dinitro-2'-hydroxy-phenyl)-1.3-dioxolane.

4. 2-(3'.5'-dinitro-2'-hydroxy-phenyl)-1.3-dioxane.

CLARENCE L. MOYLE.